(12) United States Patent
Hsu (10) Patent No.: US 12,313,457 B2
(45) Date of Patent: May 27, 2025

(54) OPTICAL SENSOR WHICH CAN REDUCE POWER NOISE AND POWER NOISE REDUCTION METHOD

(71) Applicant: PixArt Imaging Inc., Hsin-Chu (TW)

(72) Inventor: En-Feng Hsu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 273 days.

(21) Appl. No.: 18/098,719

(22) Filed: Jan. 19, 2023

(65) Prior Publication Data
US 2024/0247979 A1    Jul. 25, 2024

(51) Int. Cl.
*G01J 1/44* (2006.01)
*H02M 3/158* (2006.01)

(52) U.S. Cl.
CPC .............. *G01J 1/44* (2013.01); *H02M 3/158* (2013.01); *G01J 2001/444* (2013.01)

(58) Field of Classification Search
CPC ..... H04N 25/709; H04N 25/63; H02M 1/143; H02M 1/44; H01L 27/14643; H03M 1/12; H03M 1/0626
See application file for complete search history.

(56) References Cited

U.S. PATENT DOCUMENTS

2015/0162925 A1* 6/2015 Lee ................ H03M 1/1295
                                                    250/208.1
2024/0137057 A1* 4/2024 Takayama ............ H04B 1/10

* cited by examiner

*Primary Examiner* — Xi Wang
(74) *Attorney, Agent, or Firm* — Winston Hsu (57) ABSTRACT

An optical sensor, comprising: a sensor array, comprising a bright region with at least one bright pixel and comprising a dark region with at least one dark pixel, wherein the dark pixel generates a sensing signal that is non-relevant to light emitted to the sensor array; a power noise detection circuit, configured to compute a power noise level of the sensing signal from the dark pixel; and a power noise compensation circuit, configured to control the optical sensor to perform a power noise compensation operation according to the power noise level. A related power noise reduction method is also disclosed. Based on the present invention, the power noise of the optical sensor can be reduced without increasing the power consumption, and the power noise for a low switch frequency can also be improved.

15 Claims, 6 Drawing Sheets

OPTICAL SENSOR WHICH CAN REDUCE POWER NOISE AND POWER NOISE REDUCTION METHOD

BACKGROUND OF THE INVENTION

1. Field of the Invention

The present invention relates to an optical sensor and a power noise reduction method, and particularly relates to an optical sensor which can reduce power noise and a related power noise reduction method.

2. Description of the Prior Art

A conventional optical sensor, such as an image sensor, always comprises a DC to DC converter. The DC to DC converter is configured to convert a high voltage to a low voltage, to provide an input voltage to the optical sensor. The switches in the DC to DC converter may generate noise due to the switch operations (i.e., turn on/turn off operations) thereof. Some conventional methods are developed to reduce the power noise. However, the conventional power noise reduction mechanism could not eliminate low frequency power noise, or may cause high power consumption.

Therefore, a new power noise reduction mechanism is needed.

SUMMARY OF THE INVENTION

Therefore, one objective of the present invention is to provide an optical sensor which can reduce power noise for a low switch frequency without increasing the power consumption.

Another objective of the present invention is to provide a power noise reduction method which can reduce power noise for a low switch frequency without increasing the power consumption.

One embodiment of the present invention discloses an optical sensor, comprising: a sensor array, comprising a bright region with at least one bright pixel and comprising a dark region with at least one dark pixel, wherein the dark pixel generates at least one sensing signal that is non-relevant to light emitted to the sensor array; a power noise detection circuit, coupled to the sensor array, configured to compute a power noise level of at least one sensing signal from the dark pixel; and a power noise compensation circuit, coupled to the power noise detection circuit, and configured to control the optical sensor to perform a power noise compensation operation according to the power noise level.

Another embodiment of the present invention discloses a power noise reduction method, for reducing power noise of an optical sensor, comprising: (a) computing a power noise level of at least one sensing signal from at least one dark pixel in a sensor array of the optical sensor, wherein the sensing signal of the dark pixel is non-relevant to light emitted to the sensor array; and (b) controlling the optical sensor to perform a power noise compensation operation according to the power noise level.

In view of above-mentioned embodiments, the power noise of the optical sensor can be reduced without increasing the power consumption, and the power noise for a low switch frequency can also be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

A plurality of embodiments are provided for explaining the concepts of the present invention. In following embodiments, the optical sensor comprises a DC to DC converter, which is configured to provide an input voltage (e.g., the input voltage V_in2 in FIG. 1) to the optical sensor. The power noise level in following embodiments is a level of power noise which the DC to DC converter causes to the optical sensor. However, the concepts provided by the present invention can be applied to compensate the power noise level caused by any other factors rather than limited to be caused by the DC to DC converter.

Figure 1:
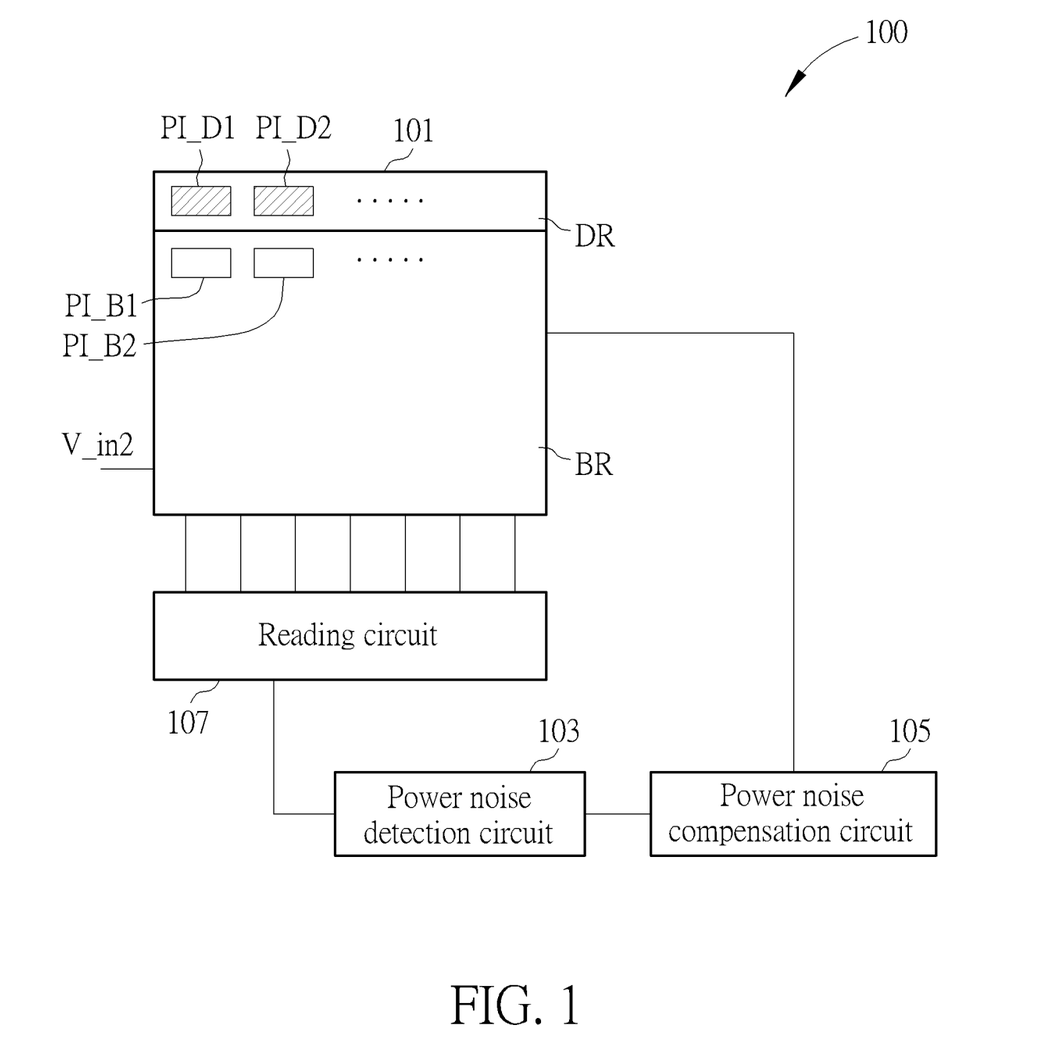
FIG. 1 is a block diagram illustrating an optical sensor according to one embodiment of the present invention.

FIG. 1 is a block diagram illustrating an optical sensor 100 according to one embodiment of the present invention. As illustrated in FIG. 1, the optical sensor 100 comprises a sensor array 101, a power noise detection circuit 103, a power noise compensation circuit 105, and a reading circuit 107.

The sensor array 101 comprises a bright region BR with at least one bright pixel (two bright pixels PI_B1 and PI_B2 are symbolized in this example) and comprises a dark region DR with at least one dark pixel (two dark pixels PI_D1 and PI_D2 are symbolized in this example). The dark pixels PI_D1, PI_D2 do not generate any sensing signal according to light, instead the dark pixels PI_D1, PI_D2 generate sensing signals that are non-relevant to light emitted to the sensor array 101. In one embodiment, the dark pixels PI_D1, PI_D2 are blocked such that the dark pixels PI_D1, PI_D2 do not receive any light, thereby the dark pixels PI_D1, PI_D2 do not generate any sensing signal according to light.

Also, please note, the shape and size of the dark region DR and the number of dark pixels can be changed corresponding to different requirements rather than limited to the examples illustrated in FIG. 1.

Power noise detection circuit 103 can read sensing signals from all pixels in the sensor array 101, thus can compute a power noise level of at least one sensing signal which is from the dark pixel PI_D1, PI_D2 and not from the bright pixels PI_B1, PI_B2. The power noise compensation circuit 105 is configured to control the optical sensor 100 to perform a power noise compensation operation according to the power noise level. In one embodiment, the power noise compensation circuit 105 controls all pixels in the sensor array 101 to perform the power noise compensation operation. The power noise compensation operation may comprise adjusting reading parameters of the reading circuit 107. Accordingly, the power noise compensation circuit 105 may adjust reading parameters which is used by the reading circuit 107 to read sensing signals from all pixels.

In one embodiment, the power noise detection circuit 103 is incorporated into the power noise compensation circuit 105. The power noise detection circuit 103 is a circuit well known by persons skilled in the art. For example, the US application with a publication number US20100039099 (application Ser. No. 12/332,294) discloses a power noise detection circuit 103. Besides, the power noise compensation circuit 105 can be implemented by various circuits. For example, the power noise compensation circuit 105 can be a processing circuit or a logic circuit comprises a plurality of logic gates.

Further, in one embodiment, the power noise detection circuit 103 automatically computes the power noise level, and the power noise compensation circuit 105 automatically controls the optical sensor 100 to perform the power noise compensation operation. In another the power noise detection circuit 103 is triggered by a command to compute the power noise level, and the power noise compensation circuit 105 is triggered by a command to control the optical sensor 100 to perform the power noise compensation operation. In one embodiment, the power noise detection circuit 103 computes the power noise level for at least one time while a frame is read by the reading circuit 107.

In one embodiment, the power noise level computed based on a frame N can be applied to adjust the reading parameters of the frame N itself, or be applied to adjust the reading parameters of a next frame N+1. For example, if the reading circuit 107 first outputs the sensing signals of the dark pixels PI_D1, PI_D2 during a frame period of the frame N, then the power noise level of the dark pixels PI_D1, PI_D2 can be computed and applied to adjust the reading parameters for reading the bright pixels PI_B1, PI_B2 during the frame period of the frame N or the frame N+1. On the contrary, if the reading circuit 107 outputs the sensing signals of the dark pixels PI_D1, PI_D2 too late in the frame period of the frame N, the power noise compensation circuit 105 does not have enough time to use the computed power noise level to adjust reading parameters for reading the bright pixels PI_B1, PI_B2 during the frame time period of the frame N. In such case, the corresponding power noise level is used to adjust reading parameters for reading the frame N+1.

Additionally, in one embodiment, power noise compensation circuit 105 does not change the frame rate of the optical sensor 100 while adjusting the reading parameters of the reading circuit 107. In other words, the time intervals between the reading circuit 107 reading two consecutive frames sensed by the sensor array 101 do not change even if the reading parameters of the reading circuit 107 are changed. As above-mentioned, the reading circuit 107 is configured to read sensing signals (i.e., the above-mentioned sensing signals) generated by the bright pixels PI_B1, PI_B2 and the dark pixels PI_D1, PI_D2. Thus power noise detection circuit 103 computes the power noise level of the sensing signals read by the reading circuit 107.

In one embodiment, the reading circuit 107 comprises at least one sampling circuit, and the above-mentioned reading parameters comprise a sampling duration of the sampling circuit. The sampling duration means the time difference between two consecutive sampling operations. In one embodiment, the sampling circuit is used to consecutively sample two times of a pixel. One time of sampling samples the pixel value of the pixel after the pixels in the sensor array 101 are exposed. Also, another time of sampling samples pixel value of the pixel after the pixel is reset. Then, the two times of sampling values are subtracted to acquire the sensing signal. In such case, the above-mentioned sampling duration means the time duration between these two samplings. By this way, the region which has a larger power noise level can be avoided without changing the frame rate.

Figure 2:
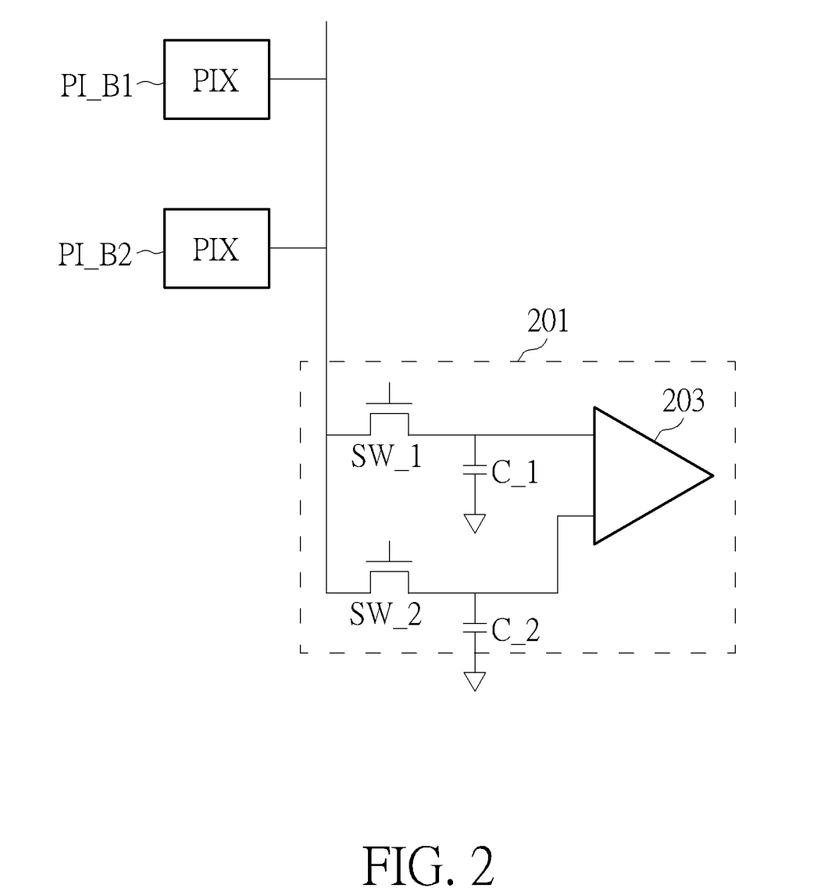
FIG. 2 is a circuit diagram illustrating a sampling circuit coupled to bright pixels in the sensor array 101 in FIG. 1, according to one embodiment of the present invention.

FIG. 2 is a circuit diagram illustrating a sampling circuit coupled to bright pixels in the sensor array 101 in FIG. 1, according to one embodiment of the present invention. In the embodiment of FIG. 2, the reading circuit 107 comprises a sampling circuit 201 coupled to the bright pixels PI_B1 and PI_B2. The sampling circuit 201 is a sample and hold circuit in this example, but not limited. The sampling circuit 201 comprises switches SW_1, SW_2, capacitors C_1, C_2 and an operational amplifier 203. It will be appreciated that the sampling circuit 201 is not limited to comprise the structure illustrated in FIG. 2 and is not limited to be provided in the reading circuit 107.

As above-mentioned, the power noise compensation operation comprises changing a sampling duration of the sampling circuit according to the power noise level. In one embodiment, the power noise compensation circuit 105 decreases the sampling duration if the power noise level is higher than a predetermined level. On the contrary, the power noise compensation circuit 105 increases the sampling duration or does not change the sampling duration if the power noise level is lower than the predetermined level. However, the power noise compensation operation may be changed corresponding to the distribution of the power noise level. For example, in one embodiment, the power noise compensation circuit 105 increases the sampling duration if the power noise level is higher than a predetermined level. On the contrary, the power noise compensation circuit 105 decreases the sampling duration or does not change the sampling duration if the power noise level is lower than the predetermined level.

Figure 3:
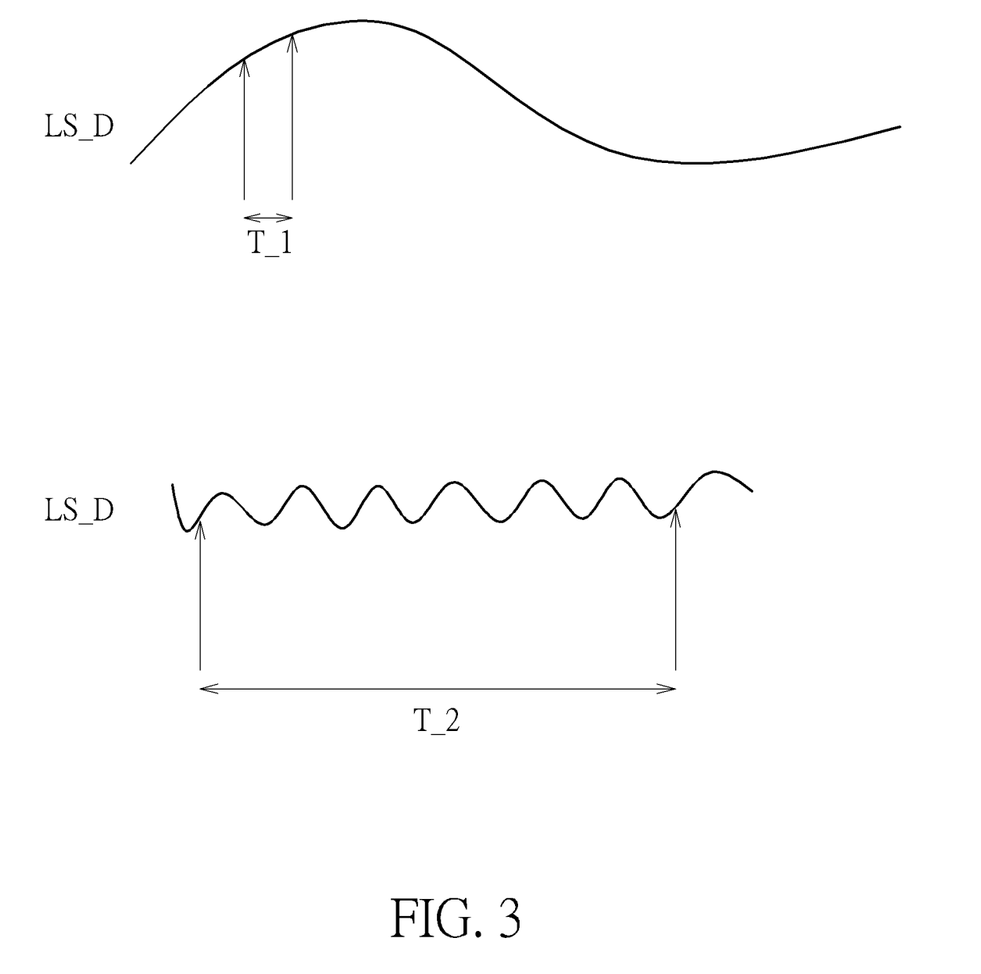
FIG. 3 is a schematic diagram illustrating how to adjust a sampling duration of the sampling circuit, according to one embodiment of the present invention.

FIG. 3 is a schematic diagram illustrating how to adjust a sampling duration of the sampling circuit, according to one embodiment of the present invention. In FIG. 3, the sensing signal LS_D is from the dark pixels PI_D1, PI_D2. In the embodiment of FIG. 3, the arrow means sampling operations performed by the sampling circuit 201. In the upper diagram of FIG. 3, the sensing signal LS_D is more smooth, which means the power noise is lower. In such case, the sampling duration is decreased thus the time interval T_1 between two continuous sampling operations is smaller and the difference between two continuous sampling values could be small.

On the contrary, in the lower diagram of FIG. 3, the sensing signal LS_D changes greatly, which means the power noise could be higher. In such case, if the sampling duration is still small, the difference between sampling values of two continuous sampling operations is large. Accordingly, the sampling duration is increased thus the time interval T_2 between two continuous sampling operations is larger. By this way, the difference between sampling values of two continuous sampling operations can be reduced. Besides the above-mentioned adjusting, in another embodiment, the sampling duration can be adjusted to a predetermined sampling duration if the power noise is higher than the predetermined power noise level. The predetermined sampling duration can be obtained through multiple tests, and is the sampling duration at which the sampling operation can be least disturbed by power noise.

In another embodiment, the power noise compensation operation comprises changing a reading duration of the reading circuit 107 according to the power noise level. In one embodiment, the reading duration is a time period by which the reading circuit 107 starts to read a whole row or a whole column of the sensor array 101 and till the reading circuit 107 starts to read a next row or a next column of the sensor array 101. Similar with the above-mentioned reading parameters, the frame rate of the optical sensor 100 is not changed when the reading duration is adjusted by the power noise compensation circuit 105.

Figure 4:
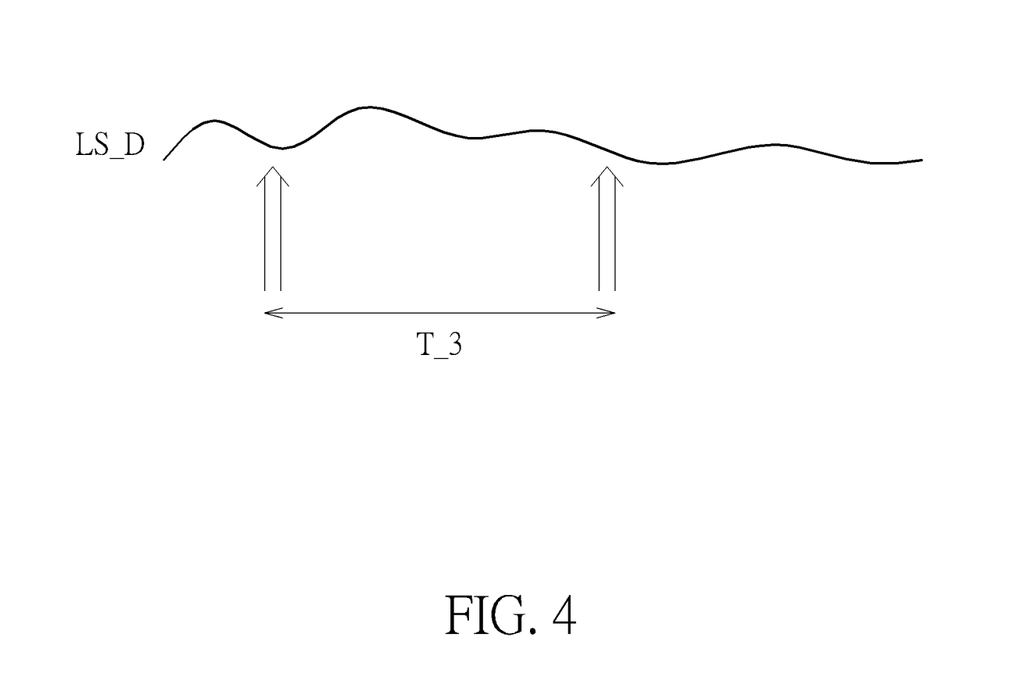
FIG. 4 is a schematic diagram illustrating how to adjust a reading duration of the reading circuit, according to one embodiment of the present invention.

FIG. 4 is a schematic diagram illustrating how to adjust a reading duration of the reading circuit, according to one embodiment of the present invention. In the embodiment of FIG. 4, the arrows which have different shapes from the arrows in FIG. 3, mean reading operations performed by the reading circuit 107. As above-mentioned, sensing signals of all pixels in the sensor array 101 are read by the reading circuit 107. In such case, the operation of "adjust a reading duration of the reading circuit" means adjust the time interval T_3 between the start time of two continuous reading operations. In one embodiment, the adjusting of the reading duration in FIG. 4 can follow the rules illustrated in FIG. 3. That is, the reading duration is decreased if the power noise is low and is increased if the power noise is high. In another embodiment, the reading duration can be adjusted to a predetermined reading duration if the power noise is higher than a predetermined power noise level. The predetermined reading duration can be obtained through multiple tests, and is the reading duration at which the reading operation can be least disturbed by power noise.

AS above-mentioned, the power noise may be caused by switch operations of the DC to DC converter. Therefore, in one embodiment, the power noise compensation operation comprises changing a switch frequency of at least one switch in the DC to DC converter according to the power noise level.

In one embodiment, the adjusting of the switch frequency can follow the rules illustrated in FIG. 3. That is, the switch frequency is increased if the power noise is low and is decreased if the power noise is high. In another embodiment, the switch frequency can be adjusted to a predetermined switch frequency if the power noise is higher than a predetermined power noise level. The predetermined switch frequency can be obtained through multiple tests, and is the switch frequency at which the switch can generate minimal noise.

Figure 5:
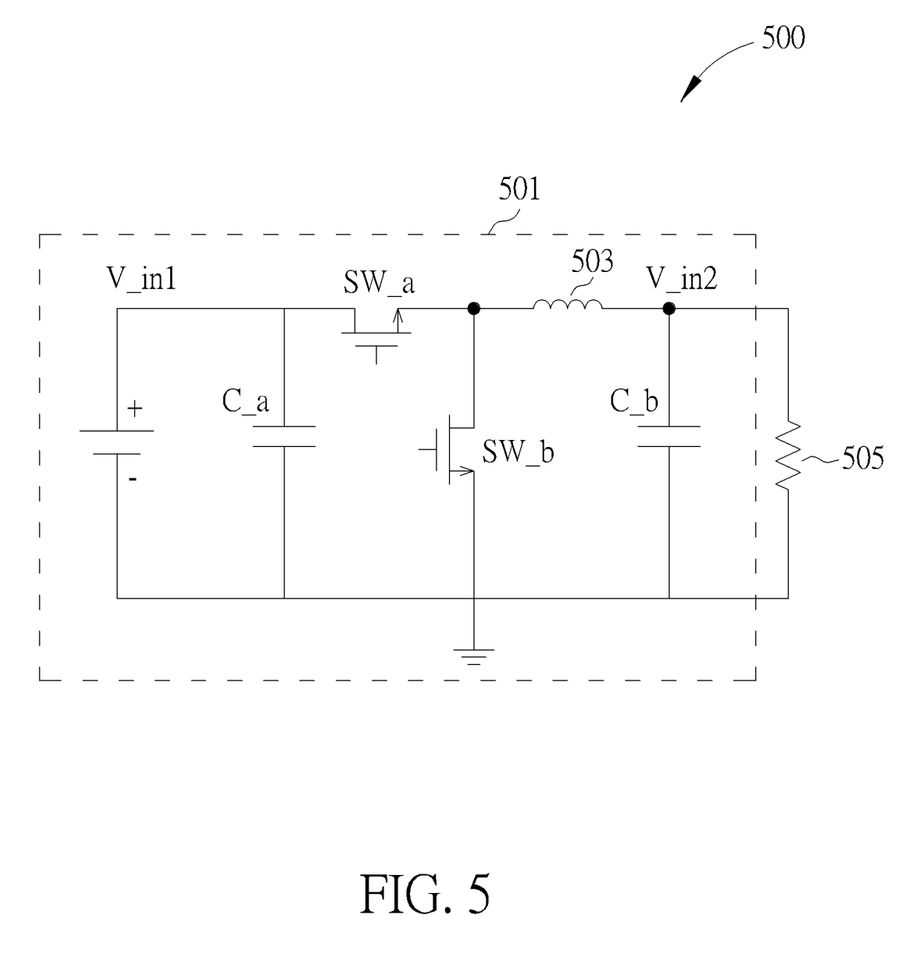
FIG. 5 is a circuit diagram illustrating how to adjust a switch frequency of at least one switch in the DC to DC converter, according to one embodiment of the present invention.

FIG. 5 is a circuit diagram illustrating how to adjust a switch frequency of at least one switch in the DC to DC converter 500, according to one embodiment of the present invention. Please note, FIG. 5 is only an example for explaining how to adjust a switch frequency, but the DC to DC converter is not limited to the circuit illustrated in FIG. 5. As shown in FIG. 5, the DC to DC converter 500 comprises a power 501, capacitors C_a, C_b, switches SW_a, SW_b and a inductor 503. The DC to DC converter 500 is configured to convert a voltage V_in1 to a voltage V_in2 lower than the voltage V_in1, via the switch operations of the switches SW_a, SW_b and the inductor 503, the capacitor C_b.

The loading 505 means a loading caused by the optical sensor 100 in FIG. 1. If the loading changes, the switch frequency of the switches SW_a, SW_b correspondingly changes. Therefore, in one embodiment, the power noise compensation circuit 105 changes a loading 505 caused by the optical sensor 100 to change the switch frequency. Various methods can be applied to change the loading 505. For example, increase the currents which flow to the optical sensor 100 or increase the resistance caused by the optical sensor 100.

Figure 6:
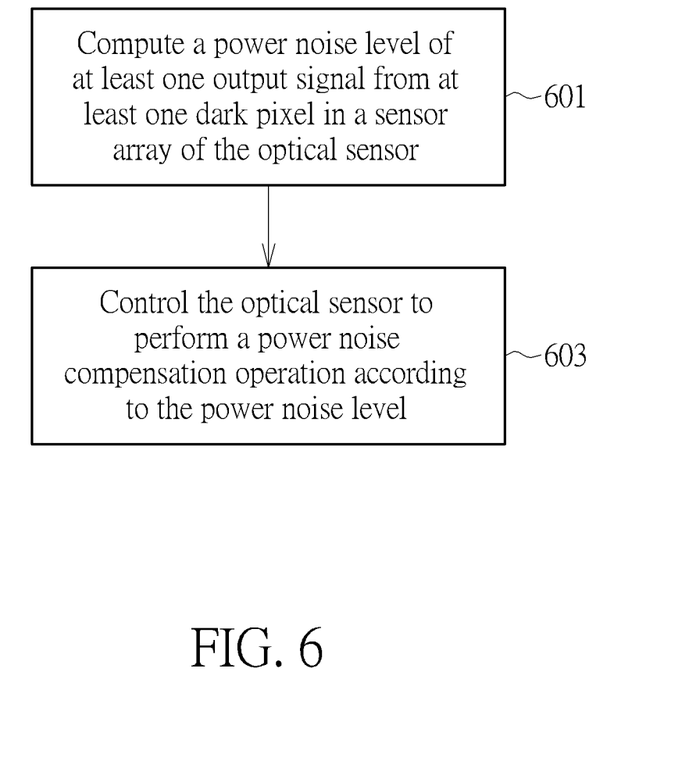
FIG. 6 is a flow chart illustrating a power noise reduction method according to one embodiment of the present invention.

In view of above-mentioned embodiments, a power noise reduction method can be acquired. FIG. 6 is a flow chart illustrating a power noise reduction method according to one embodiment of the present invention, which comprises following steps:

Step 601

Compute a power noise level of at least one sensing signal from at least one dark pixel (e.g., the dark pixels PI_D1, PI_D2 in FIG. 1) in a sensor array (e.g., the sensor array 101 in FIG. 1) of the optical sensor (e.g., the optical sensor 100 in FIG. 1).

Step 603

Control the optical sensor to perform a power noise compensation operation according to the power noise level.

As shown in the embodiment of FIG. 3, the power noise compensation operation can comprise changing a sampling duration of the sampling circuit (e.g., the sampling circuit illustrated in FIG. 2) according to the power noise level. As shown in the embodiment of FIG. 4, the power noise compensation operation comprises changing a reading duration of the reading circuit (e.g., the reading circuit 107 in FIG. 1) according to the power noise level. As shown in the embodiment of FIG. 5, the power noise compensation operation comprises changing a switch frequency of at least one switch in the DC to DC converter according to the power noise level. The power noise for a low switch frequency can still be reduced by these methods.

In view of above-mentioned embodiments, the power noise of the optical sensor can be reduced without increasing the power consumption, and the power noise for a low switch frequency can also be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor, comprising:
   a sensor array, comprising a bright region with at least one bright pixel and comprising a dark region with at least one dark pixel, wherein the dark pixel generates at least one sensing signal that is non-relevant to light emitted to the sensor array;
   a power noise detection circuit, configured to compute a power noise level of the sensing signal from the dark pixel;
   a power noise compensation circuit, coupled to the power noise detection circuit, and configured to control the optical sensor to perform a power noise compensation operation according to the power noise level; and a reading circuit, coupled to the sensor array and comprising at least one sampling circuit;

wherein the power noise compensation operation comprises changing a sampling duration of the sampling circuit according to the power noise level.

2. The optical sensor of claim 1, wherein the power noise compensation circuit increases the sampling duration if the power noise level is higher than a predetermined level.

3. The optical sensor of claim 1, wherein the power noise compensation circuit decreases the sampling duration or does not change the sampling duration if the power noise level is lower than a predetermined level.

4. An optical sensor, comprising:

a sensor array, comprising a bright region with at least one bright pixel and comprising a dark region with at least one dark pixel, wherein the dark pixel generates at least one sensing signal that is non-relevant to light emitted to the sensor array;

a power noise detection circuit, configured to compute a power noise level of the sensing signal from the dark pixel;

a power noise compensation circuit, coupled to the power noise detection circuit, and configured to control the optical sensor to perform a power noise compensation operation according to the power noise level; and a reading circuit, coupled to the sensor array;

wherein the power noise compensation operation comprises changing a reading duration of the reading circuit according to the power noise level.

5. The optical sensor of claim 4, wherein the reading duration is a time period by which the reading circuit starts to read a whole row or a whole column of the sensor array and till the reading circuit starts to read a next row or a next column of the sensor array.

6. An optical sensor, comprising:

a sensor array, comprising a bright region with at least one bright pixel and comprising a dark region with at least one dark pixel, wherein the dark pixel generates at least one sensing signal that is non-relevant to light emitted to the sensor array;

a power noise detection circuit, configured to compute a power noise level of the sensing signal from the dark pixel;

a power noise compensation circuit, coupled to the power noise detection circuit, and configured to control the optical sensor to perform a power noise compensation operation according to the power noise level; and a DC to DC converter, wherein the power noise compensation operation comprises changing a switch frequency of at least one switch in the DC to DC converter according to the power noise level.

7. The optical sensor of claim 6, wherein the power noise compensation circuit changes a loading caused by the optical sensor to change the switch frequency.

8. A power noise reduction method, for reducing power noise of an optical sensor, comprising:

(a) computing a power noise level of at least one sensing signal from at least one dark pixel in a sensor array of the optical sensor, wherein the sensing signal of the dark pixel is non-relevant to light emitted to the sensor array; and (b) controlling the optical sensor to perform a power noise compensation operation according to the power noise level;

wherein the optical sensor further comprises:

a reading circuit, coupled to the sensor array and comprising at least one sampling circuit; and wherein the power noise compensation operation comprises changing a sampling duration of the sampling circuit or changing a reading duration of the reading circuit according to the power noise level.

9. The power noise reduction method of claim 8, wherein the step (b) increases the sampling duration if the power noise level is larger than a predetermined level.

10. The power noise reduction method of claim 8, wherein the step (b) decreases the sampling duration or does not change the sampling duration if the power noise level is smaller than a predetermined level.

11. The power noise reduction method of claim 8, wherein the reading duration is a time period by which the reading circuit starts to read a whole row or a whole column of the sensor array and till the reading circuit starts to read a next row or a next column of the sensor array.

12. The power noise reduction method of claim 8, further comprising:

applying a DC to DC converter to provide an input voltage to the optical sensor, wherein the power noise level is a level of power noise which the DC to DC converter causes to the optical sensor.

13. The power noise reduction method of claim 12, wherein the power noise compensation operation comprises changing a switch frequency of at least one switch of the optical sensor according to the power noise level.

14. The power noise reduction method of claim 13, wherein the step (b) changes a loading caused by the optical sensor to change the operation frequency.

15. The power noise reduction method of claim 8, further comprising:

blocking the dark pixel such that the dark pixel does not receive any light.

* * * * *